United States Patent [19]

Gowan et al.

[11] 4,397,659
[45] Aug. 9, 1983

[54] FLOWLINE DEGASER

[76] Inventors: William L. Gowan, P.O. Box J, Blooming Grove 76626; Charles K. Wadkins, 255 Barbee, Tyler, Tex. 75703

[73] Assignee: Lucas Industries Limited, Birmingham, England

[21] Appl. No.: 276,009

[22] Filed: Jun. 22, 1981

[51] Int. Cl.³ .............................................. B01D 19/00
[52] U.S. Cl. ........................................ 55/41; 55/52; 55/55; 55/192; 55/201
[58] Field of Search ......... 55/41, 48, 52, 55, 189-194, 55/199, 201

[56] References Cited

U.S. PATENT DOCUMENTS

| | | | |
|---|---|---|---|
| 457,917 | 8/1891 | Shaw | 55/194 |
| 1,457,153 | 5/1923 | Elliott | 55/193 |
| 1,776,019 | 9/1930 | Elliott | 55/193 |
| 1,800,724 | 4/1931 | Elliott | 55/193 |
| 2,195,898 | 4/1940 | Newton | 55/190 X |
| 2,663,379 | 12/1953 | Doan | 55/192 |
| 2,748,884 | 6/1956 | Erwin | 55/193 |
| 2,869,673 | 1/1959 | Erwin | 55/192 |
| 3,085,587 | 4/1963 | O'Shields | 137/4 |
| 3,136,583 | 6/1964 | Griffin | 55/190 X |
| 3,136,723 | 6/1964 | Erwin et al. | 210/512.1 |
| 3,201,919 | 8/1965 | Long | 55/55 X |
| 3,213,594 | 10/1965 | Long | 55/169 |
| 3,214,019 | 10/1965 | Griffin | 210/97 |
| 3,241,295 | 3/1966 | Griffin et al. | 55/190 X |
| 3,255,576 | 6/1966 | Dawkins | 55/192 |
| 3,271,929 | 9/1966 | Bowden et al. | 55/52 |
| 3,314,219 | 4/1967 | Griffin et al. | 55/190 X |
| 3,322,198 | 5/1967 | McHenry | 166/81 |
| 3,325,974 | 6/1967 | Griffin et al. | 55/192 X |
| 3,338,319 | 8/1967 | Griffin | 175/25 |
| 3,342,215 | 9/1967 | Griffin | 138/45 |
| 3,342,216 | 9/1967 | Griffin | 138/45 |
| 3,358,425 | 12/1967 | Burnham, Sr. | 55/52 X |
| 3,362,136 | 1/1968 | Burnham, Sr. et al. | 55/191 X |
| 3,362,487 | 1/1968 | Lindsey | 175/38 |
| 3,363,404 | 1/1968 | Griffin et al. | 55/192 X |
| 3,402,527 | 9/1968 | Moore | 55/189 X |
| 3,676,984 | 7/1972 | Clark | 55/193 |
| 3,898,061 | 8/1975 | Brunato | 55/193 |
| 4,046,528 | 9/1977 | Liljestrand | 55/192 X |
| 4,088,457 | 5/1978 | Phillips et al. | 55/194 |
| 4,097,249 | 6/1978 | Phillips et al. | 55/52 X |
| 4,155,724 | 5/1979 | Burnham, Sr. | 55/193 |
| 4,247,312 | 1/1981 | Thakur et al. | 55/193 X |
| 4,272,258 | 6/1981 | Shifflett | 55/55 X |

Primary Examiner—Robert H. Spitzer
Attorney, Agent or Firm—Richards, Harris & Medlock

[57] ABSTRACT

A Flowline Degaser (10) is provided which is positioned in a drilling operation between the bell nipple (24) and the shale shaker (34) and mud tanks (37). The degaser (10) includes a structure defining a downwardly inclined surface (62) for dispersing drilling mud flowing thereover to remove gas. The inclined surface also includes baffles (64) for agitating the drilling mud to remove additional gas. The gas is removed through vent ports (68, 70) and into an upper expansion chamber (76) for disposal. Blowers (82, 84) are positioned on the degaser for drawing a vacuum within the upper expansion chamber (76) and space (66) within the tank above the inclined surface to drive gas from the mud. The vacuum is sufficient to effect the mud at the bell nipple to prevent accumulation of gas about the bell nipple. This forms a significant safety factor in removing potentially explosive gas from the rig above the bell nipple. If the drilling operation employs a blowout preventor, the vent line may also enter the degaser (10) for degasing of mud flowing therethrough.

12 Claims, 3 Drawing Figures

4,397,659

FLOWLINE DEGASER

TECHNICAL FIELD

This invention relates to the drilling of hydrocarbon bearing deposits and, in particular, to the treating of mud employed in the drilling process.

BACKGROUND ART

The typical bore hole or well drilled to recover gas and oil is created by positioning a drill bit at the lower end of a drill string and rotating the drill string with a force acting through the drill string urging the drill bit against the formation to be drilled. As the drill bit works through the formation, additional drill string sections may be added from the surface until the desired depth is achieved.

During drilling, it is common to provide a drilling mud to cool and clean the drill bit of material cut from the drilling face. The mud flows to the drill bit through the hollow center core of the drill string from a pump on the surface. The mud returns to the surface through the annular space between the drill string and the bore hole.

During the circulation of the mud in the bore hole, gases, such as natural gas or hydrogen sulfide, will be entrained in the mud. Upon reaching the surface, these gases must be eliminated from the mud to prevent combustion. After the mud has been degased and cleansed of debris from the cutting face, it may be reused within the bore hole.

In the typical operation, the mud will flow upward in the bore hole through a blow out preventor, to a bell nipple beneath the rig floor. A flow line then extends from the bell nipple to a shale shaker to remove the cuttings or chips accumulated in the mud. The gas rich mud then flows from the shale shaker into mud tanks for storage. A degaser may be provided on the mud tank which acts to degasify the mud stored therein. A mud gas separator may be employed at the end of the tanks and is used during control drilling or during a blowout or gas kick. When the blow out preventor blocks flow through the low pressure bell nipple it directs the mud flow through a high pressure vent line to the mud gas separator. A gas kick occurs when a sufficiently large volume of gas is entrained in the mud flow to interrupt the flow of the mud. A blowout will occur if sufficient gas is entrained to reduce the hydrostatic head of mud in the bore hole to where it will not maintain the hydrocarbon reserves within the hole. Finally, a vacuum blower system may be employed on the rig to draw out the gas impregnated air about the bell nipple and under the rig floor for the safety of the men working on the rig.

One system of mud degasification is described and illustrated in U.S. Pat. No. 2,748,884 issued June 5, 1956. In this apparatus, gas filled mud may travel from the choke manifold or shale shaker into a mud trough. The mud tank may then pass into a shale shaker and mud tanks or pits. A mud degaser tank is positioned above the mud trough and picks up the gas filled mud by vacuum through a suction pipe. The mud passes downwardly over a series of cascade plates within a vacuum to remove the entrained gases.

However, a need has arisen to simplify and improve the procedure of mud degasification and treatment. A need also exists to combine the functions of degaser, mud gas separator and vacuum blower system in a single inexpensive reliable device. A critical concern is the mobility of a device for treating and degasing drilling mud so that the device may be transferred from site to site without great effort.

SUMMARY OF THE INVENTION

In accordance with one aspect of the present invention, an apparatus is provided for degasifying drilling mud exiting from a bell nipple in a drilling operation. The apparatus includes a tank structure having an inlet port at a first elevation for connection to the bell nipple through a flow line and an outlet port at a lower, second elevation. A structure is provided within the tank structure defining a downwardly inclined surface from the first port to the second port for dispersing the mud to remove gas therefrom. Vent structure is provided in communication with the tank structure above the inclined surface for venting the removed gas from the tank structure.

In accordance with another aspect of the present invention, the vent structure includes a blower structure for creating a vacuum within the tank structure above the inclined surface. This acts to drive gas from the mud. The vacuum is also sufficient to draw gas from the flow line adjacent the bell nipple to prevent accumulation of gas in the area surrounding the bell nipple.

In accordance with yet another aspect of the present invention, the outlet port is connected to a flow line extending to a shale shaker and a mud tank. The mud flowing to the shale shaker and mud tank is degased to reduce the gas accumulation about the shale shaker and mud tank.

In accordance with yet another aspect of the present invention, the apparatus is adapted for use in a drilling operation having a choke manifold to prevent blowout, the apparatus further having a choke inlet port connected to the choke for entry of mud for degasing.

In accordance with another aspect of the present invention, a method is provided for degasing mud used in a drilling operation and exiting the bore hole in a bell nipple. The method includes the steps of directing the mud from the bell nipple for flow through a flow line into a tank structure through an inlet port therein and dispersing the mud flow over a downwardly inclined surface within the tank structure to remove gas therefrom. The method further includes the step of venting the gas removed from the tank structure to a removal stack. In accordance with other features of the method, a step is provided for drawing the mud from the flow line entering the tank structure and the bell nipple with a vacuum above the inclined surface in the tank structure to prevent accumulation of gas in the area about the bell nipple.

DETAILED DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
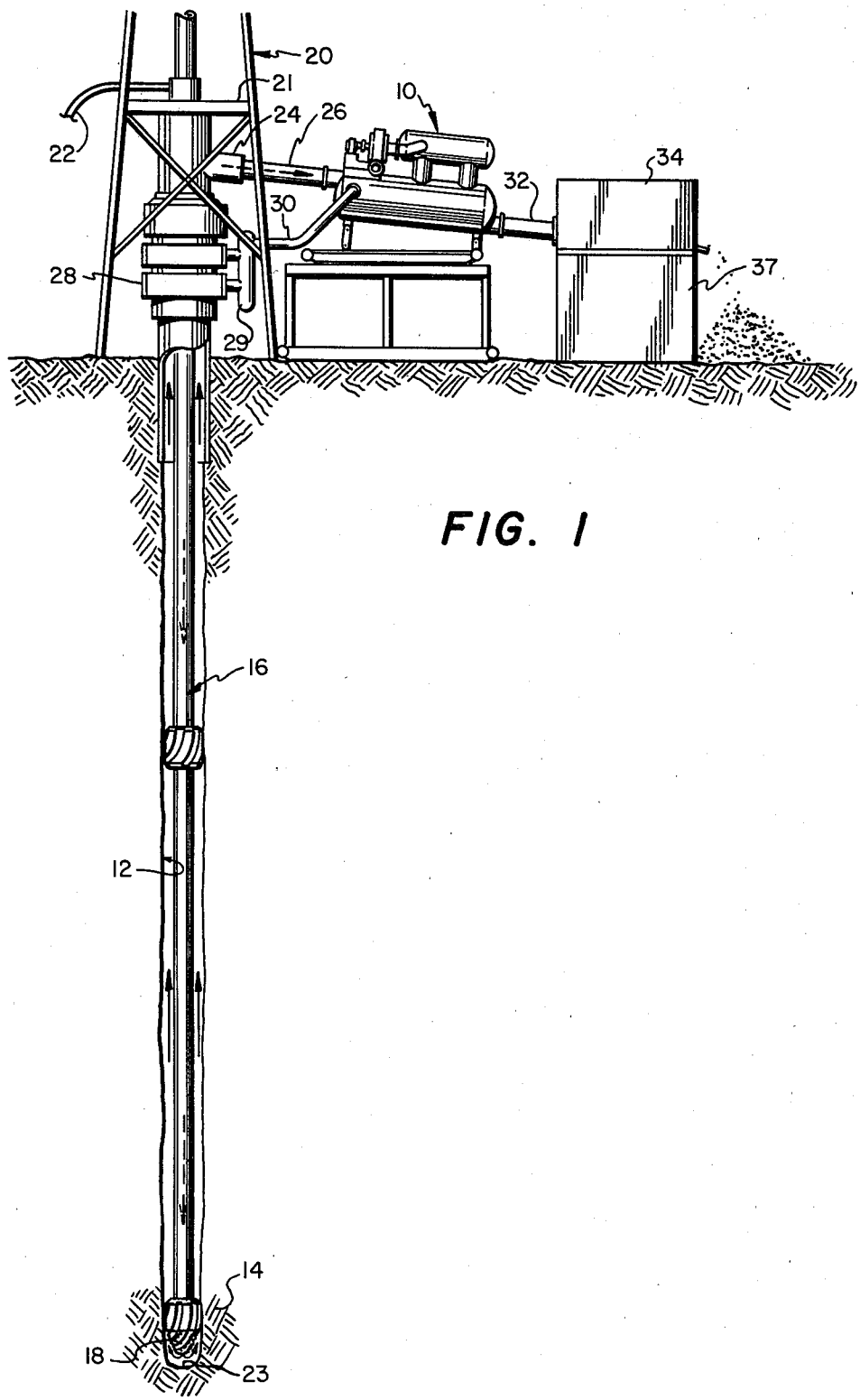
FIG. 1 is a schematic view of the flow path of the drilling mud in a drilling operation.
Figure 2:
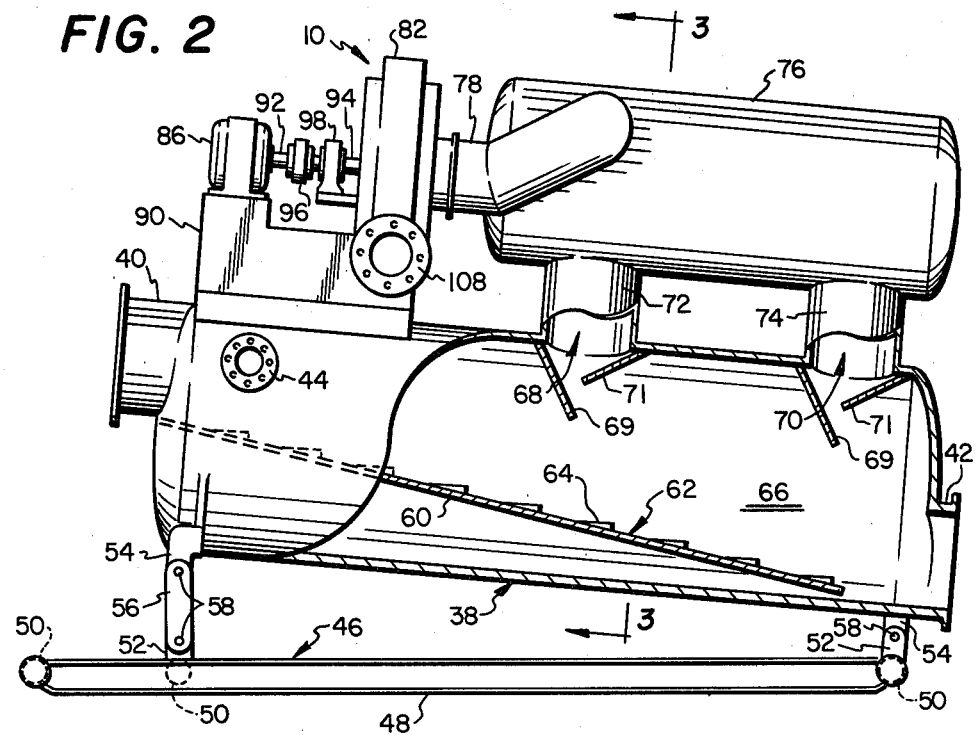
FIG. 2 is a side view of a flowline degaser forming a first embodiment of the present invention.
Figure 3:
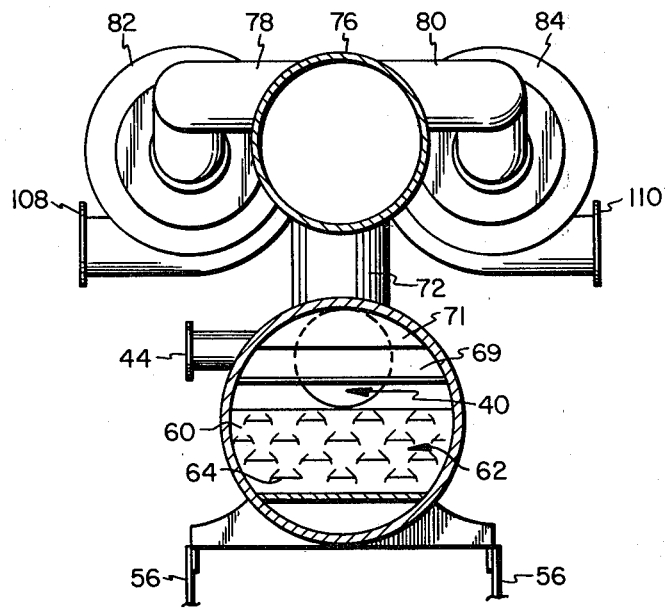
FIG. 3 is a vertical cross section view of the mud flowline degaser taken along the line 3—3 in FIG. 2 in the direction of the arrows.

Referring now to the drawings, wherein like reference characters designate like or corresponding parts throughout several views, FIGS. 1-3 illustrate a flowline degaser 10 forming a first embodiment of the present invention.

The use of the flowline degaser 10 is best described with reference to FIG. 1. FIG. 1 illustrates the bore hole 12 drilled into the formation 14 for recovery of resources such as oil and natural gas. The bore hole is formed by rotating the drill string 16 having drill bit 18 on the lower end thereof. The drill string extends upward above ground level for rotation by structure on the drilling rig 20 above the floor 21 of the drilling.

Mud flow is provided from a pump through an inlet line 22 extending into the hollow center core of the drill string 16. The drilling mud flows downward and about the drill bit 18 and drilling face 23 to remove debris and chips therefrom. The drilling mud carries the debris upward in the annular zone between the drilling string and bore hole to the surface at bell nipple 24. A flow line 26 extends from the bell nipple downward into the inlet of the flowline degaser 10. The bell nipple lies above a blowout preventor 28 and choke manifold 29. The blowout preventor 28 directs the mud through choke manifold 29 and to a high pressure blowout line 30 should a blowout occur in the drilling operation.

In the flowline degaser 10, the mud is degased and gas vented as will be described in greater detail hereinafter. A flow line 32 permits the degased mud to flow downwardly into a shale shaker 34 to remove large particles in the mud. The shale shaker sits on top of the mud tank 37 and mud falls into the tank which stores the mud until reused in the drilling operation.

The construction and operation of the flowline degaser 10 is best described with reference to FIGS. 2 and 3. The degaser 10 includes a tank 38. The tank has an inlet port 40 at a first elevation and an outlet port 42 at a lower, second elevation. A blowout vent port 44 is provided near the inlet port for connection to the blowout line 30. The inlet port 40 is connected to the flow line 26. The outlet port 42 is connected to the flow line 32.

The tank is supported on a skid 46. The skid 46 includes several runners 48 and a number of cross members 50. Brackets 52 extend upwardly from the cross members for supporting the tank. Brackets 54 extend downward from the bottom of the tank. At the end adjacent the inlet port 40, spacing links 56 are provided between the brackets 52 and 54 for elevating the end of the tank. The tank is secured to the skid by a number of pins 58 securing the brackets.

Located within the tank 38 is a plate 60 defining an inclined surface 62. The surface extends downwardly from the inlet port to the outlet port. Along its length are a series of baffles 64. The mud from the bell nipple will flow down flow line 32 and over the inclined surface 62 under the influence of gravity. As the mud flows over the inclined surface, the mud will be dispersed to a small thickness. In one device constructed under the teachings of the present invention, the thickness of the mud is less than ¼". The gas entrained in the mud will be removed therefrom as a result of the greater cross sectional area exposed to the space 66 above the inclined surface. The baffles will agitate the mud to further remove gas therefrom.

Two vent ports 68 and 70 are provided in the upper portion of the tank 38 near the outlet port 42. Baffle plates 69 and 71 may be secured within the tank to prevent mud from being splashed into the vent ports. Inlet sections 72 and 74 are positioned over these vent ports and extend into an upper expansion chamber 76. Blower inlet tubings 78 and 80 extend from the chamber 76 into blowers 82 and 84, respectively. The blowers are operated by motors 86 and 88 (not shown) secured to structure 90 on the tank. Motor 86 includes a drive shaft 92 coupled to the blower shaft 94 by a coupling 96. The blower shaft 94 may be supported for rotation within a pillow block bearing 98. The motor 88 includes a similar drive shaft coupled to blower shaft through a coupling. A pillow block bearing supports the blower shaft.

The discharge flanges 108 and 110 of the blowers 82 and 84 are connected to a vent stack for burning the separated gases.

During the drilling operation, gas may be encountered flowing into the mud and causing the mud weight in the borehole to lighten. This increases the chance of a blowout. When this occurs, the operator may turn on either one or both of the blowers 82 and 84 to create a negative pressure or vacuum within the space 66 above the inclined surface 62. As the mud passes over the inclined surface and baffles, the vacuum will draw gas therefrom for disposal through the chamber 76 and to the vent stack. The provision of two blowers permits the operator to adjust the vacuum necessary to properly degas the mud.

A significant advantage of the present invention as embodied in the degaser 10 is the ability to create a vacuum sufficient to effect mud in the flow line 26 and bell nipple 24. This will draw gas from mud at the bell nipple and in the flow line into the degaser 10. This prevents gas from accumulating in the area around the bell nipple under the rig floor 21 to prevent potential injury to personnel on the rig. Therefore, it is not necessary to provide a vacuum blower system to draw air away from the area about the bell nipple.

Another significant advantage of the present invention is the degasing of the drilling mud prior to flowing into the shale shaker and mud tanks. This reduces the accumulation of gas about the shaker and tanks and reduces the chance of a fire hazard or explosion in these areas.

During drilling, excess gas may be entrained in the mud. The well operator may be forced to shut the well in with the blowout preventor. However, the degaser 10 permits the fluid to be released through the choke line 30 for degasing in the degaser 10. Therefore, the mud gas separator typically found on the mud tanks in conventional operations is not necessary.

The blowers may still be operated even if the volume of the gas in the mud from the well bore is small. A volume of air may be drawn into the degaser through the bell nipple, however the mixture of gas and air would be harmless when reaching the flare stack. Even such gases as hydrogen sulfide could either be burned at the flare stack or diluted to a harmless state.

Another significant advantage of the present invention is the fact that the mud will be degased even if all power to the drilling operation ceases. The flow of the mud from the bell nipple is induced by gravity which increases the reliability of the operation in the degaser 10.

Finally, the degaser is designed to be transported readily and handled with light equipment, such as a winch truck. The degaser is readily prepared for operation on the site.

In summary, the degaser 10 permits a single unit to perform the functions of the degaser, mud gas separator and vacuum blower system commonly employed in present drilling operations. The degaser 10 also employes gravity in its operation, providing a safety factor which will continually operate the degaser even in the absence of external power.

Although a single embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

We claim:

1. A method for degasing drilling mud used in a drilling operation and exiting the bore hole in a bell nipple comprising the steps of:
   directing drilling mud from the bell nipple through a flow line into a tank means through an inlet port therein;
   dispersing the mud flow over a downwardly inclined surface within said tank means to remove gas from the drilling mud and the mud flowing out of said tank means through an outlet port;
   venting the removed gas from said tank means for disposal, the drilling mud flowing into said tank means and through said tank means by gravity flow; and
   drawing the drilling mud from the flow line entering said tank means in the bell nipple with a vacuum within said tank means to prevent accumulation of gas in the area surrounding the bell nipple.

2. A method for degasing drilling mud used in a drilling operation and exiting the bore hole in a bell nipple comprising the steps of:
   directing the drilling mud from the bell nipple downwardly through a flow line for flow into a tank through an inlet port therein;
   dispersing the drilling mud flowing into said tank over a downwardly inclined surface within said tank to remove gas therefrom;
   agitating the drilling mud by positioning baffles on the inclined surface for removal of additional gas therefrom;
   venting the gas removed from the drilling mud flowing through said tank for disposal;
   removing the drilling mud flowing through said tank through an outlet port in said tank; and
   evacuating the area in said tank above the inclined surface to drive gas from the driling mud flowing therethrough, the vacuum being sufficient to draw gas from drilling mud at the bell nipple to prevent accumulation of gas surrounding the area about the bell nipple.

3. An apparatus for degasing drilling mud exiting from a bell nipple in a drilling operation comprising:
   a tank means having an inlet port at a first elevation for flow of the drilling mud exiting said bell nipple therethrough and an outlet port at a lower, second elevation;
   structure within said tank means defining a downwardly inclined surface from said first to said second port for dispersing the drilling mud to remove gas therefrom; and
   vent means communicating with said tank means above said inclined surface for venting the removed gas from said tank means, said vent means including a blower means for creating a vacuum within said tank means above the inclined surface to drive gas from the mud, the vacuum being sufficient to draw gas from mud at the bell nipple to prevent accumulation of gas in the area surrounding the bell nipple.

4. An apparatus for degasing drilling mud exiting from a bell nipple in a drilling operation comprising:
   a tank having an inlet port proximate one end of said tank for connection to said bell nipple for flow of the drilling mud exiting the bell nipple into said tank and an outlet port proximate the opposite end of said tank for flow of the drilling mud from said tank;
   structure within said tank defining a downwardly inclined surface from the inlet to outlet ports for dispersing and agitating drilling mud flowing through said tank to remove gas therefrom;
   an upper expansion chamber positioned above said tank and communicating with the space in said tank above the inclined surface by vents to permit the gas from the tank to flow therein for disposal; and
   at least one blower for drawing gas from said upper expansion chamber for disposal, the blower creating a vacuum within said upper expansion chamber and tank to drive gas from the drilling mud flowing through said tank, the vacuum being sufficient to draw gas from the drilling mud at the bell nipple to prevent accumulation of gas in the area surrounding the bell nipple.

5. The apparatus of claim 4 wherein said tank includes splash plate structure positioned within said tank above the inclined surface for preventing drilling mud from entering the vents communicating with said upper expansion chamber.

6. The apparatus of claim 4 wherein said structure defines baffles on the downwardly inclined surface for agitating the drilling mud.

7. The apparatus of claim 4 wherein said outlet port is connected to a flow line extending to a shale shaker and mud tank, the mud flowing therethrough being degased to reduce gas accumulation about the shale shaker and mud tank.

8. The apparatus of claim 4 for use in a drilling operation having a choke manifold to prevent blowout, the choke manifold having a choke line, the apparatus further comprising a choke line inlet port proximate said one end of said tank to permit entry of drilling mud flowing through the choke line for degasing.

9. An apparatus for use in a drilling operation, the drilling operation using drilling mud exiting a bore hole through a bell nipple and having gas entrapped therein comprising:
   a tank forming a gas tight enclosure having an inlet port in a first end thereof, the inlet port being in fluid communication with the bell nipple permitting the drilling mud exiting the bore hole to flow into said tank, and an outlet port at the opposite end of said tank to permit removal of the drilling mud flowing therethrough and at least one vent port proximate said opposite end of said tank;
   structure defining a planar downwardly inclined surface from the inlet port to the outlet port, the drilling mud flowing through said tank flowing over the inclined surface and dispersing the drilling mud to remove gas therefrom, the inclined surface further having a plurality of baffles secured therealong to agitate the drilling mud to remove additional gas, the vent port being positioned above the inclined surface to permit gas removed from the drilling mud to flow therethrough;

an upper expansion chamber positioned above said tank and communicating with the vent port for flow of removed gas therein for disposal; and at least one blower for drawing gas from said upper expansion chamber for disposal, the blower creating a vacuum within said upper expansion chamber and tank to drive gas from the drilling mud, the vacuum being sufficient to draw gas from the mud at the bell nipple to prevent accumulation of gas in the area surrounding the bell nipple.

10. The apparatus of claim 9 further having splash plates positioned within the space above the inclined surface for preventing drilling mud from entering the vent.

11. The apparatus of claim 9 wherein said outlet port communicates with a shale shaker and mud tank, the drilling mud flowing therethrough being degased to reduce the accumulation of gas around the shale shaker and mud tank.

12. The apparatus of claim 9 for use in a drilling operation having a choke manifold to prevent blowout, the choke manifold having a choke line, said tank further having a choke line inlet port proximate said one end to permit entry of drilling mud through the choke line for degasing.

* * * * *

UNITED STATES PATENT AND TRADEMARK OFFICE
CERTIFICATE OF CORRECTION

PATENT NO. : 4,397,659

DATED : August 9, 1983

INVENTOR(S) : William L. Gowan and Charles K. Wadkins

It is certified that error appears in the above-identified patent and that said Letters Patent is hereby corrected as shown below:

On the title page delete

(73) Assignee: "Lucas Industries Limited, Birmingham, England"

Column 5, line 54, change "driling" to -- drilling --.

Signed and Sealed this

Fourteenth Day of February 1984

[SEAL]

Attest:

Attesting Officer

GERALD J. MOSSINGHOFF

Commissioner of Patents and Trademarks